United States Patent Office 3,300,451
Patented Jan. 24, 1967

3,300,451
CHLORINATED PIVALOLACTONES AND POLYMERS THEREOF
Winston J. Jackson, Jr., and John R. Caldwell, Kingsport, Tenn., assignors to Eastman Kodak Company, Rochester, N.Y., a corporation of New Jersey
No Drawing. Filed Jan. 7, 1964, Ser. No. 336,129
21 Claims. (Cl. 260—78.3)

This invention relates to novel chlorinated pivalolactones, to the method for preparing the same, and to polymers thereof.

Polypivalolactone is a highly crystalline, brittle material finding little use in fibers, films, and molded objects. Heretofore, it has been proposed to improve the properties of this polymer by employing $\beta,\beta'$-dichloropivalolactone as described in U.S. Patent 2,853,474, or the hydroxy acid of $\beta,\beta'$-dichloropivalolactone as described in U.S. Patent 2,848,441, as the monomer. The dichloropivalolactone is obtained (U.S. Patent 2,853,474) from the silver or lead salt of $\beta,\beta',\beta''$-trichloropivalic acid which, according to J. Am. Chem. Soc., 67, 943 (1945), is prepared by treating pentaerythritol in pyridine with thionyl chloride to form pentaerythrityl trichlorohydrin which is then oxidized to the trichloro acid with nitric acid. This procedure for obtaining the polymer is commercially impractical, particularly from the standpoints of time and expense. Moreover, the chlorine content of the recurring units of the polymer is non-variable as well as limited to a maximum of two chlorine atoms per unit.

Objects of the present invention, therefore, are: to provide a large variety of chlorinated pivalolactones and low-molecular-weight polymers thereof useful as herbicides, fungicides, insecticides, and the like; to provide a new series of high-molecular-weight, chlorinated polypivalolactones having various desirable chlorine contents and hence a variety of combinations of physical and chemical properties such as non-flammability, relatively high melting points, solubilities in low-boiling solvents, and toughness and hence more extensive utility for fibers, films, surface coatings, molded articles and similar specific applications; and to provide a commercially practicable process for preparing these polymers in a regulatable and consistent manner.

These and other objects hereinafter becoming evident have been achieved in accordance with the present invention through the discovery that the monomeric pivalolactone may be directly chlorinated to any desired degree by contacting it with free chlorine radicals formed through the agency of ultraviolet or visible radiation, or free-radical initiators. Quite unexpectedly, the chlorination goes smoothly without formation of contaminating byproducts, or cleavage of the lactone ring.

The new chloropivalolactone monomeric systems generally consist of mixtures of pivalolactone molecules containing different amounts of chlorine. It is practical to introduce up to about three chlorine atoms, on the average, into the pivalolactone molecule. In the monomeric system, the groups —$CH_3$, —$CH_2Cl$, and —$CHCl_2$, are present in amounts dependent upon the degree of chlorination of the mixture as a whole. The presence of these groups, for example, in a monomer system chlorinated to an average degree of about one chlorine atom per molecule and analyzed by nuclear magnetic resonance averaged approximately as follows: 1.3 (—$CH_3$), 0.5 (—$CH_2Cl$), and 0.2 (—$CHCl_2$), per molecule. In general, it may be stated that where relatively low average chlorine substitution is achieved, substantial amounts of —$CH_3$ groups are present, and where relatively high average chlorine substitution is achieved, substantial amounts of —$CHCl_2$ groups are present.

In the chlorination process, chlorine is passed (bubbled through) a solution of the lactone in a relatively inert solvent such as carbon tetrachloride while illuminating the reaction system with visible or ultraviolet light or while periodically adding a free-radical initiator. Other useful solvents include tetrachlorethane, tetrabromomethane, and methylene chloride. The free-radical initiators useful in the present invention may be selected from the group consisting of inorganic peroxy, organic peroxy and azo compounds and redox systems. Examples of such initators are: $H_2O_2$ and the alkali metal persulfates; acetyl peroxide, dibenzoyl peroxide, t-butyl peroxide and benzoyl peroxide; $\alpha,\alpha'$-azobisisobutyronitrile and p-methoxybenzene diazo thio-2-naphthyl ether; and lauroyl peroxide-triphenylamine, or ammonium persulfate-sodium bisulfite, respectively.

It is advantageous to carry out the chlorination in the presence of powdered calcium carbonate which neutralizes the hydrogen chloride which is formed, or in the presence of water which removes the hydrogen chloride from the carbon tetrachloride layer, or both water and calcium carbonate. The reaction temperature may be 0–80° C. and is preferably 10–40° C. Although the solvent may be omitted, it is preferrable to carry out the chlorination in a solvent and in the presence of powdered calcium carbonate to avoid side reactions and polymer formation. Other chlorinating agents such as sulfuryl chloride or phosphorus pentachloride may be used, but chlorine is more effective. In general, it may be said that any compound and technique which can release a free chlorine radical for chlorinating hydrocarbons may be employed. For example, in addition to the above means, compounds such as tertiarybutyl hypochlorite, $PCl_5$, and sulfuryl chloride, when heated to at least about 50° C., will cause chlorination. At the completion of the chlorination the organic layer is dried and the solvent is removed. The residual product is suitable for polymerization, or it may be first distilled. By the above-described process, chloropivalolactone containing from about 0.1 to about 3 chlorine atoms per molecule on the average may be prepared. Other lactones may be similarly chlorinated, such as propiolactone, butyrolactone, and other 2,2-dialkylpropiolactones but, in general, these chlorolactones are less stable than the chloropivalolactones. The polymers are also appreciably lower-melting.

The particularly useful monochloropivalolactone, which when isolated in substantially pure form can be blended at will with other gross chlorinated pivalolactone systems to conveniently and accurately adjust the chlorine content in the polymer, is obtained by chlorinating each mole of pivalolactone with 0.5 mole of chlorine and then separating the monochloro product from the unchlorinated pivalolactone by distillation (see Example 3 below). This compound has the structure

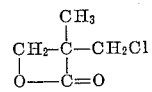

The chloropivalolactones of this invention are polymerized by heating in the presence of an acidic or basic catalyst. Acidic catalysts which may be used include sulfuric acid, toluenesulfonic acid, antimony pentachloride, and boron trifluoride etherate. Higher polymer molecular weights are obtained with basic catalysts such as triethylamine, tributylamine, triethylenediamine, dimethylaniline, alkali-metal hydroxides, and alkali-metal alkoxides. The amount of catalyst added is preferably 0.01 to 1.0 percent by weight of the monomer. The polymerizations may be carried out at 0–100° C., but temperatures of 50–80° C. are preferred. Inert solvents may be present. It is noted that it is possible to first hydrolyze the lactones to the hydroxy acid and then polymerize. This method is not preferred. Copolymers may be prepared which contain units from pivalolactone or other 2,2-dialkylpropiolactones. Copolymers containing units such as those described in column 2 of U.S. Patent 2,853,474, also may be prepared.

Chloropivalolactone containing about 2 to 3 chlorine atoms per unit may also be used as herbicides, fungicides, and insecticides. The low-molecular-weight polymers (mol. wt. <3000) are particularly valuable for these purposes. Poly(chloropivalolactone) containing about 1.5 chlorine atoms per polymer unit is soluble in volatile solvents such as methylene chloride, and films and fibers can be obtained by casting and wet-spinning. Polymers containing about 2 chlorine atoms per unit is nonburning. Polypivalolactone, on the other hand, is flammable and is insoluble in methylene chloride and similar solvents. Because polypivalolactone is very highly crystalline, its molded objects, film, and fibers are relatively brittle. Poly(chloropivalolactone) is less crystalline and, consequently, the polymer is tougher.

The following specific examples illustrate but do not limit the invention. The inherent viscosities of the polymers were measured in 1:1,methylene chloride/trifluoroacetic acid.

Example 1

In a 500-ml., three-necked flask were placed 50 g. (0.50 mole) of pivalolactone, 150 ml. of carbon tetrachloride, 50 ml. of water, and 50 g. (0.50 mole) of calcium carbonate powder. While the mixture was rapidly stirred, irradiated with a 275-watt ultraviolet lamp, and cooled with a water bath which held the temperature at 30–40° C., a small amount of chlorine was passed in from a lecture bottle. After initiation had occurred, indicated by loss of the green chlorine color in the solution, chlorine was added until the weight loss of the lecture bottle was 36 g. (0.5 mole). This required 30 minutes. The mixture was then filtered. The carbon tetrachloride layer was separated from the aqueous layer and dried with sodium sulfate, and the carbon tetrachloride was removed by distillation under reduced pressure. When a portion of the residual product was heated on a steam bath with 0.1% of triethylamine, a solid polymer was obtained. It softened at 160–180° C. and was soluble in tetrachloroethane. The carbonyl band in an infrared spectrum of the polymer was at $5.8\mu$. The remainder of the chloropivolactone was distilled. It consisted of a mixture which boiled at 55–75° C./0.6 mm. A chlorine analysis indicated that 27.6% chlorine was present. The infrared spectrum had a carbonyl band at $5.3$–$5.5\mu$, indicating the presence of the strained, four-membered lactone ring. (Unchlorinated pivalolactone has a carbonyl band at $5.5\mu$.)

Example 2

The procedure of Example 1 was used in chlorinating pivalolactone in a mixture consisting of 50 g. (0.50 mole) of the lactone, 200 ml. of carbon tetrachloride, and 100 g. (1.0 mole) of calcium carbonate powder. One mole (71 g.) of chlorine was added. A fraction which distilled at 60–70° C./0.5 mm. weighed 18 g. and contained 38.6% chlorine. It consisted of a mixture of chloropivalolactone. A fraction which distilled at 70–102° C./0.5 mm. weighed 25 g. and contained 42.4% chlorine. It consisted essentially of dichloropivalolactone.

Example 3

Example 2 was repeated, but only 18 g. (0.25 mole) of chlorine and 25 g. (0.25 m.) of powdered calcium carbonate were added and visible illumination was used instead of ultraviolet. One fraction was obtained which boiled at 50–56° C./10 mm. and consisted essentially of unchlorinated pivalolactone. The second fraction, which boiled at 60–63° C./0.3 mm., consisted essentially of 2-chloromethyl-2-methylpropiolactone.

*Analysis.*—Calcd. for $C_5H_7ClO_2$: C, 44.7; H, 5.2; Cl, 26.4. Found: C, 44.9; H, 5.4; Cl, 26.1.

Example 4

By the method of Example 1 trichloropivalolactone is prepared by the addition of 106 g. (1.5 moles) of chlorine to a mixture of 50 g. (0.50 mole) of pivalolactone and 150 ml. of carbon tetrachloride. The product which is obtained after removal of the solvent is particularly useful as a herbicide, fungicide, or insecticide.

Example 5

A low-melting polymer of low molecular weight is obtained by heating the trichloropivalolactone of Example 4 with 0.5% of tributylamine for 2 hours at 60° C. It is valuable as a herbicide, fungicide, or insecticide. A high-molecular-weight polymer melting at about 50° C. is obtained by extending the heating period. It is soluble in methylene chloride.

Example 6

2-chloromethyl-2-methylpropiolactone (Example 3) and 0.05% by weight of triethylenediamine were heated in a water bath at 60° C. for 8 hours. The polymer obtained had an inherent viscosity of 0.56. After fractionation by dissolving in a 50:50 mixture of methylene chloride and trifluoroacetic acid and precipitating in methanol, the polymer had an inherent viscosity of 0.72. It softened at 220–230° C. Useful fibers were obtained by dry-spinning.

Example 7

Dichloropivalolactone, prepared in Example 2, and 0.1% by weight of triethylenediamine were heated in a water bath at 60° C. for 12 hours. The polymer obtained had an inherent viscosity of 0.48 and was soluble in methylene chloride. A film was obtained by casting from methylene chloride. It was nonburning according to ASTM test D568–61.

The invention has been described in detail with particular reference to preferred embodiments thereof, but it will be understood that variations and modifications can be effected within the spirit and scope of the invention as described hereinabove and as defined in the appended claims.

We claim:

1. Chlorinated pivalolactone containing from one to three chlorine atoms and containing a radical selected from the group consisting of —$CH_3$ and —$CHCl_2$.

2. The process for preparing the composition of claim 1 comprising contacting pivalolactone with chlorine at from 0 to about 80° C. in the presence of a chlorination promoter and sufficient water or $CaCO_3$ to prevent hydrolysis of the chloropivalolactone.

3. The process for preparing the composition of claim 1 comprising contacting pivalolactone with chlorine at from 0 to about 80° C. in the presence of a chlorination promoter selected from the group consisting of ultraviolet radiation, visible light, and a free-radical initiator and sufficient water or $CaCO_3$ to prevent hydrolysis of the chloropivalolactone.

4. The process for preparing the composition of claim 1 comprising contacting pivalolactone with chlorine at from 0 to about 80° C. in the presence of a chlorination promoter wherein the pivalolactone is solubilized with a solvent substantially inert to chlorine and sufficient water or $CaCO_3$ to prevent hydrolysis of the chloropivalolactone.

5. The process for preparing the composition of claim 1 comprising contacting pivalolactone with chlorine at from 0 to about 80° C. in the presence of a chlorination promoter wherein the pivalolactone is solubilized with a solvent substantially inert to chlorine and wherein sufficient water is present to reduce the concentration of HCl in the chloropivalolactone phase and hence the tendency of the chloropivalolactone to hydrolyze.

6. The process for preparing the composition of claim 1 comprising contacting pivalolactone with chlorine at from about 0 to about 80° C. in the presence of a chlorination promoter wherein the pivalolactone is solubilized with a solvent substantially inert to chlorine and wherein $CaCO_3$ is dispersed in the reaction medium to neutralize HCl formed.

7. The process for preparing the composition of claim 1 comprising contacting pivalolactone with chlorine at from about 0 to about 80° C. in the presence of a chlorination promoter wherein the pivalolactone is solubilized with a solvent substantially inert to chlorine, and wherein sufficient water is present to reduce the concentration of HCl in the chloropivalolactone phase and hence the tendency of the chloropivalolactone to hydrolyze, and wherein $CaCO_3$ is dispersed in the reaction medium to neutralize HCl formed.

8. The random copolymer of the composition of claim 1.

9. A mixture of chlorinated pivalolactones containing at least one group selected from the group consisting of —$CH_3$ and —$CHCl_2$.

10. The random copolymer of the composition of claim 9.

11. A monomeric system consisting essentially of a mixture of pivalolactone molecules, at least some of which contain less and some of which contain more than two chlorine atoms per molecule.

12. The random copolymer of the composition of claims 11.

13. A mixture of chlorinated pivalolactones containing a radical selected from the group consisting of —$CH_3$ and —$CHCl_2$, and containing on the average from about 0.1 to about 3.0 chlorine atoms per molecule.

14. The random copolymer of the composition of claim 13.

15. A mixture of chlorinated pivalolactones containing a radical selected from the group consisting of —$CH_3$ and —$CHCl_2$ and containing on the average from about 1.0 to about 2.0 chlorine atoms per molecule.

16. The random copolymer of the composition of claim 15.

17. The composition of matter 2-chloromethyl-2-methylpropiolactone.

18. The polymer of 2-chloromethyl-2-methylpropiolactone.

19. A fiber comprised of the random copolymer of the composition of claim 1.

20. A film comprised of the random copolymer of the composition of claim 1.

21. A molded article comprised of the random copolymer of the composition of claim 1.

References Cited by the Examiner

UNITED STATES PATENTS 3,001,921    9/1961    Pennino _____ 260—78.3

FOREIGN PATENTS 766,347    1/1957    Great Britain.
775,495    5/1957    Great Britain.

OTHER REFERENCES

Gresham et al.: J.A.C.S., 72 (p. 72), 1950.

JOSEPH L. SCHOFER, *Primary Examiner.*

L. WOLF, L. G. CHILDERS, *Assistant Examiners.*